United States Patent
Ogura et al.

(10) Patent No.: US 11,295,267 B2
(45) Date of Patent: Apr. 5, 2022

(54) SOFTWARE MANAGEMENT DEVICE, SOFTWARE MANAGEMENT SYSTEM, AND NON-TRANSITORY COMPUTER READABLE MEDIUM STORING PROGRAM

(71) Applicant: FUJIFILM Business Innovation Corp., Tokyo (JP)

(72) Inventors: Takeshi Ogura, Kanagawa (JP); Toru Nakatani, Kanagawa (JP); Koji Hashimoto, Kanagawa (JP); Haruki Matsui, Kanagawa (JP); Aiko Nozue, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 406 days.

(21) Appl. No.: 16/115,585

(22) Filed: Aug. 29, 2018

(65) Prior Publication Data

US 2019/0073628 A1    Mar. 7, 2019

(30) Foreign Application Priority Data

Sep. 5, 2017    (JP) ............................. JP2017-170341

(51) Int. Cl.
*G06Q 30/00* (2012.01)
*G06Q 10/08* (2012.01)
(Continued)

(52) U.S. Cl.
CPC ....... *G06Q 10/087* (2013.01); *G06Q 30/0641* (2013.01); *G06F 3/0482* (2013.01)

(58) Field of Classification Search
CPC .............. G06Q 30/0641; G06Q 10/087; G06F 3/0482
(Continued)

(56) References Cited

U.S. PATENT DOCUMENTS 9,516,185 B2 * 12/2016 Sugiyama .......... H04N 1/00973
9,946,342 B2    4/2018 Fujiwara et al.
(Continued)

FOREIGN PATENT DOCUMENTS

JP    2001356912    12/2001
JP    2006065388    3/2006
(Continued)

OTHER PUBLICATIONS

"DCX's flashware," Kimberley, William. Automotive Design & Production 114.10: 24-25. Gardner Business Media Inc. (Oct. 2002); Dialog #217441390 3pgs. (Year: 2002).*
(Continued)

*Primary Examiner* — Robert M Pond
(74) *Attorney, Agent, or Firm* — JCIPRNET

(57) ABSTRACT

A software management device includes a display which is a section that displays a product list showing a software product satisfying a predetermined condition, and displays a product list including an item indicating a registered face-to-face selling product which is sold on a face-to-face basis and for which license information has been registered, in a case where the registered face-to-face selling product satisfies the predetermined condition, and a controller that non-restrictively receives a user operation with respect to an on-line selling product, which is a software product sold on line, in a case where the user has an on-line purchase right, and restrictively receives a user operation with respect to the registered face-to-face selling product in a case where the user does not have the on-line purchase right.

10 Claims, 15 Drawing Sheets

(51) Int. Cl.
*G06Q 30/06* (2012.01)
*G06F 3/0482* (2013.01)

(58) Field of Classification Search
USPC .................................................. 705/26, 27
See application file for complete search history.

(56) References Cited

U.S. PATENT DOCUMENTS

| | | | | |
|---|---|---|---|---|
| 2005/0024671 A1* | 2/2005 | Abe | ...................... | G06F 3/1254 |
| | | | | 358/1.13 |
| 2012/0257240 A1* | 10/2012 | Yuki | ...................... | G06F 21/608 |
| | | | | 358/1.14 |
| 2013/0067463 A1* | 3/2013 | Ito | ............................ | G06F 8/60 |
| | | | | 717/178 |
| 2013/0253999 A1* | 9/2013 | Pinkus | ............... | G06Q 30/0264 |
| | | | | 705/14.16 |

FOREIGN PATENT DOCUMENTS

| | | |
|---|---|---|
| JP | 2008243179 | 10/2008 |
| JP | 2011170639 | 9/2011 |
| JP | 2011253417 | 12/2011 |
| JP | 2014006587 | 1/2014 |
| JP | 2015153073 | 8/2015 |

OTHER PUBLICATIONS

"Office Action of Japan Counterpart Application", dated Jul. 6, 2021, with English translation thereof, p. 1-p. 9.

* cited by examiner

FIG. 6

| USER ID | NAME | ... | PRESENCE OR ABSENCE OF WEB PURCHASE RIGHT | PURCHASED PRODUCT ID | LICENSE KEY | IN USE | ... |
|---|---|---|---|---|---|---|---|
| | | | | | ******** | Y | |
| **** | ***** | | Y | | ******** | Y | |
| | | | | ******** | ******** | Y | |
| | | | | | ******** | N | |
| | | | | | ******** | N | |
| **** | ***** | | N | ******** | ******** | Y | |

| | | PRODUCT A | PRODUCT B | ... |
|---|---|---|---|---|
| PRODUCT BASIC INFORMATION | PRODUCT ID | | | |
| | PRODUCT VERSION | 1.0 | 1.0 | |
| | PRODUCT NAME | ***** | **** | |
| | YEAR, MONTH AND DAY OF RELEASE | 3/1/2017 | 3/3/2017 | |
| | TARGET DEVICE TYPE | 1.1.21.1<br>1.1.21.2<br>... | 1.1.21.1<br>1.1.21.2<br>1.1.21.3<br>... | |
| | INSTALLER URL | ******* | ******** | |
| | ... | | | |
| PRODUCT CONFIGURATION INFORMATION | MODULE ID/ VERSION/ TARGET DEVICE TYPE/ RELATION INFORMATION/ ... | (1)Module_A/<br>1.0/<br>1.1.21.1,<br>1.1.21.2,.../<br>or<br>(2)Module_AA/<br>1.0/<br>1.1.21.1,<br>1.1.21.3,.../ | (2)Module_A/<br>1.0/<br>1.1.21.1,<br>1.1.21.2,.../<br>and<br>(2)Module_BB/<br>1.0/<br>1.1.21.1,<br>1.1.21.2,.../ | |
| | ... | | | |

FIG. 15

PURCHASED PRODUCT LIST — 244

| PRODUCT NAME | LICENSE | | | |
|---|---|---|---|---|
| | TOTAL | IN USE | THE NUMBER OF REMAINING LICENSES | ... |
| ****** | 5 | 3 | 2 | PURCHASE |
| ... | | | | |

246 — THE NUMBER OF REMAINING LICENSES: 2
248 — PURCHASE

SOFTWARE MANAGEMENT DEVICE, SOFTWARE MANAGEMENT SYSTEM, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2017-170341 filed Sep. 5, 2017.

BACKGROUND (i) Technical Field

The present invention relates to a software management device, a software management system, and a non-transitory computer readable medium storing a program for software management.

(ii) Related Art

Software management systems are systems that manage software which is installed or to be installed in a device to be subjected to software management (hereinafter, also referred to as a "software product" or simply a "product" as occasion demands). For example, installation, updating, or uninstallation of software is managed by the system, and a license to the software is managed.

In offices and the like, plural image forming devices connected to a network are used. Software providing an expansionary function required by a user may be installed afterwards (in advance in some cases) with respect to each of the image forming device. The realization of software management systems capable of integrally or unitarily managing such a software group has been expected.

SUMMARY

According to an aspect of the invention, there is provided a software management device including a display which is a section that displays a product list showing a software product satisfying a predetermined condition, and displays a product list including an item indicating a registered face-to-face selling product which is sold on a face-to-face basis and for which license information has been registered, in a case where the registered face-to-face selling product satisfies the predetermined condition, and a controller that non-restrictively receives a user operation with respect to an on-line selling product, which is a software product sold on line, in a case where the user has an on-line purchase right, and restrictively receives a user operation with respect to the registered face-to-face selling product in a case where the user does not have the on-line purchase right.

BRIEF DESCRIPTION OF THE DRAWINGS

Exemplary embodiment(s) of the present invention will be described in detail based on the following figures, wherein:

FIG. 6 is a diagram illustrating another configuration example of a user information table;

FIG. 7 is a diagram illustrating a configuration example of a product information table;

FIG. 15 is a diagram illustrating still another image according to the exemplary embodiment.

DETAILED DESCRIPTION

Hereinafter, an exemplary embodiment of the invention will be described with reference to the accompanying drawings.

1. Overall Description

Figure 1:
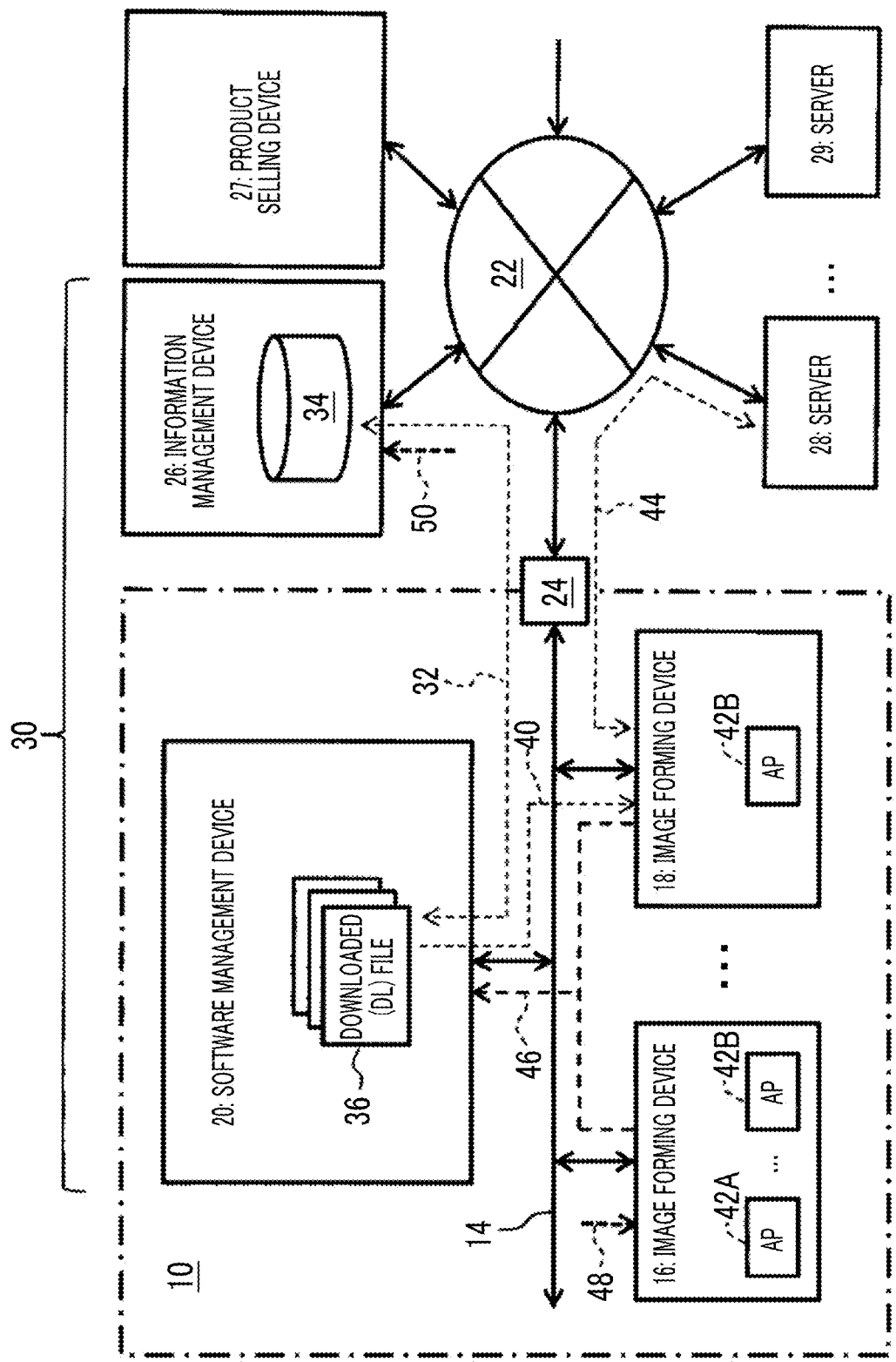
FIG. 1 is a block diagram illustrating a software management system according to an exemplary embodiment.

FIG. 1 illustrates a software management system according to the exemplary embodiment. The software management system is a system that integrally or unitarily manages one or plural software products which are installed or to be installed in one or plural devices. Typically, each software product is an application program installed in a device in order to expand a function of the device. Naturally, a software product which is installed in the device from the beginning may be an object to be managed. The software product is a software commodity from a point of view of buying and selling. Hereinafter, a software product may be simply referred to as a "product".

In the software management system according to the exemplary embodiment, a device having a software product installed therein is an image forming device. The image forming device is a so-called multifunction machine having one or plural document processing functions such as a scanner, a copier, a printer, and a facsimile. A software product installed in another device, such as a general-purpose information processing device or a terminal device for a specific use, may be managed by the software management system.

In the configuration example illustrated in FIG. 1, a Local Area Network (LAN) 14 is provided in an office 10. The office 10 is an example, and an institution provided with the LAN 14 may be a public institution, a school, and the like. Plural image forming devices 16 and 18 are connected to the LAN 14, as plural devices to be subjected to software management. Each of the image forming devices 16 and 18 generally has one or plural document processing functions as described above.

In the configuration example illustrated in the drawing, plural software products (AP) 42A and 42B are installed in the image forming device 16, and the software product (AP) 42B is installed in the image forming device 18. In this manner, the same software product 42B may be installed in the plural image forming devices 16 and 18. A specific configuration of each of the image forming devices 16 and 18 will be described later with reference to FIG. 2.

The software management device 20 according to the exemplary embodiment is a device for managing a software product group which is installed or to be installed in the plural image forming devices 16 and 18. The software management device 20 is connected to the LAN 14. The software management device 20 manages the downloading, installation, version upgrading, uninstallation, and the like with respect to each of software products which are used in the plural image forming devices 16 and 18. The management is performed in accordance with license information to be described later. In addition, the software management device 20 is also used in a case where a user purchases a software product on line, on the assumption the user has a WEB purchase right (on-line purchase right) to be described later.

The software management device 20 is constituted by, for example, a personal computer (PC) as an information processing device. The software management device may be constituted by a portable terminal device or the like. The software management device 20 may be constituted by plural PCs. In the exemplary embodiment, the software management device 20 is configured as a device which is separate from a device to be subjected to software management. Naturally, the software management device 20 may be embedded into a device to be subjected to software management.

The software management device 20 according to the exemplary embodiment has a function of displaying a product list, particularly, a function of displaying a product list including an item representing a face-to-face selling product (a "registered face-to-face selling product"), to be described later, which is a software product sold on a face-to-face basis and satisfies a certain condition. In addition, the software management device 20 has a function of receiving a user operation and performing control in accordance with the user operation, particularly, a function of receiving a certain user operation with respect to a face-to-face selling product (a "registered face-to-face selling product" to be described later) satisfying the above-described certain condition and performing control in accordance with the user operation. A specific configuration of the software management device 20 will be described later in detail with reference to FIG. 9.

The LAN 14 is connected to the Internet 22 as an external network through a connection apparatus 24. The connection apparatus 24 is constituted by a bridge, a router, a gateway, or the like. An information management device 26 and a product selling device 27 are connected to the Internet 22 in the configuration example illustrated in the drawing, and some servers 28 and 29 are connected to the Internet 22.

The information management device 26 manages information necessary for managing each software product in the software management device 20, and specifically, user information, license information, product information, and other information, and provides information necessary in the functioning of the information management device with respect to the software management device 20. The necessary information includes information necessary in displaying the product list, information necessary in managing a license, and the like in the software management device 20. The information management device 26 includes a memory 34 that functions as a database. A specific configuration of the information management device 26 will be described later in detail with reference to FIGS. 3 to 8.

The software management system 30 according to the exemplary embodiment is constituted by the software management device 20 and the information management device 26. The devices 20 and 26 may be formed integrally. The software management system 30 may include the product selling device 27 to be described later.

The product selling device 27 is a device that that sells a pay software product (pay product) on-line, and specifically, has a function of performing charging processing on a pay product, a function of delivering the pay product through a network, and the like. The product selling device 27 according to the exemplary embodiment also has a function of delivering a free software product (free product) through a network. In the configuration example illustrated in the drawing, the information management device 26 and the product selling device 27 are operated in association with each other at the time of the selling of a pay product or the provision of a free product. A user may acquire and use a desired product without being especially conscious of which device is accessed, on the condition that a certain condition, such as user registration, is satisfied. Meanwhile, the product selling device 27 may be embedded into the information management device 26. On the contrary, the information management device 26 may be embedded into the product selling device 27. Each of the information management device 26 and the product selling device 27 may be constituted by one or plural information processing devices.

Each of the servers 28 and 29 is a device that provides a certain service in cooperation with the software products 42A and 42B installed in the image forming devices 16 and 18. Examples of such a service include a document storage service and the like. The software products 42A and 42B for requesting a service may be referred to as client software. Naturally, software products to be installed in the image forming devices 16 and 18 may also include a software product which individually functions without requiring the provision of a service by the server. Examples of such a software product include a software product enabling a collective operation by packaging plural user operations.

Hereinafter, a basic operation of the software management system 30 will be described. The description will be given on the assumption that the user of the software management device 20 is registered as a user and has a WEB purchase right (that is, the user has an account for purchasing a pay product on line). In a case where a user performs an operation of designating and purchasing a specific pay product on-line in a state where the user logs on the software management system 30, charging processing, the registration of license information, and the like are executed in accordance with the operation (see reference numeral 32). Subsequently, in a case where the user performs a downloading operation, an installer for installing a purchased product is transmitted to the software management device 20 from the information management device 26 or the product selling device 27. The downloaded installer is stored in the software management device 20.

In the configuration example illustrated in the drawing, an installer is configured by packaging plural programs and the like, and is shown as a downloaded (DL) file 36 in FIG. 1. Specifically, the installer includes a software product (executable program) which is installed in the image forming device, an executable program which is installed in the software management device to perform installation, version upgrading, and the like of the software product.

In a case where a user designates the image forming device (for example, the image forming device 18) as an installation destination and performs an installation operation on a software product in the software management device 20, the software product within the downloaded file 36 is transmitted to the image forming device as an installation destination and is installed in the image forming device (see reference numeral 40). Therefore, the software product functions in an image processing device which is an installation destination. For example, the software product is operated in association with a server (for example, the server 28) (see reference numeral 44). The software management device 20 has a function of displaying an installed product list in retrieving and specifying a software product group installed in plural image forming devices (see reference numeral 46). In addition, a product list indicating products (for example, a purchased pay product and a free product) which are usable by the user, and the like are displayed in accordance with a user operation. Examples of the user operation with respect to the software product include downloading, installation, updating, uninstallation, and the like.

Hereinafter, a type of software product and a user right will be arranged. Software products installed in the image forming device generally include a pay software product (pay product) and a free software product (free product). The software products are generally acquired on line from a product providing WEB site (the product selling device 27 in the configuration example illustrated in the drawing). On-line selling for a pay product is referred to as "WEB selling", and is also referred to as "WEB purchase" from a point of view of a user. In general, user registration and the acquisition (registration) of a WEB purchase right are required as the premise of WEB purchase. The user registration in the former case is a prerequisite when the user logs on the software management system. The acquisition of a WEB purchase right in the latter case is a prerequisite when the user purchases a pay product on line from the product providing WEB site (the product selling device 27 in the configuration example illustrated in the drawing). The satisfaction and examination of a credit condition, a charging condition, and a settlement condition are premises for the issuance of the WEB purchase right. Users may also include a user who has already been registered but does not have a WEB purchase right. In other words, accounts on the software management system 30 include a purchasable account which is capable of login and purchasing a pay product and a purchase restrictive account which is capable of login but is not capable of purchasing a pay product.

A selling mode other than WEB selling is "face-to-face selling". A pay software product (face-to-face selling product) which is sold on a face-to-face basis (which is sold on line) is installed in a target image forming device by, for example, a customer engineer or the like (see reference numeral in FIG. 1). In a case where a user who purchases a face-to-face selling product and has a purchase restrictive account logs on the software management system through the software management device, some problems may occur. For example, in a case where the face-to-face selling product purchased by the user is not displayed at all in the product list displayed on the software management device, the user may feel uneasy or misunderstand. In a case where a user operation for the face-to-face selling product purchased by the user is not admitted at all on the software management device, the user may feel uncomfortable.

Based on the above, the software management system according to the exemplary embodiment includes a configuration in which it is also possible to perform the registration of license information with respect to a face-to-face selling product (see reference numeral 50 in FIG. 1). Even in a case where a user does not have a WEB purchase right with respect to a product, being a face-to-face selling product, for which license information has been registered (registered face-to-face selling product), the user may confirm the registered face-to-face selling product on a screen for software management, and a certain user operation may be performed on the registered face-to-face selling product.

Meanwhile, the user is a person who has an account capable of logging on the software management system, and is an acquisitor of a software product (a purchaser in a case of a pay product) and a user of the system. The user is conceptually different from a user of the image forming device. However, the purchase, management, and the like of the software product may be performed in units of user groups.

2. Description of Image Forming Device

Figure 2:
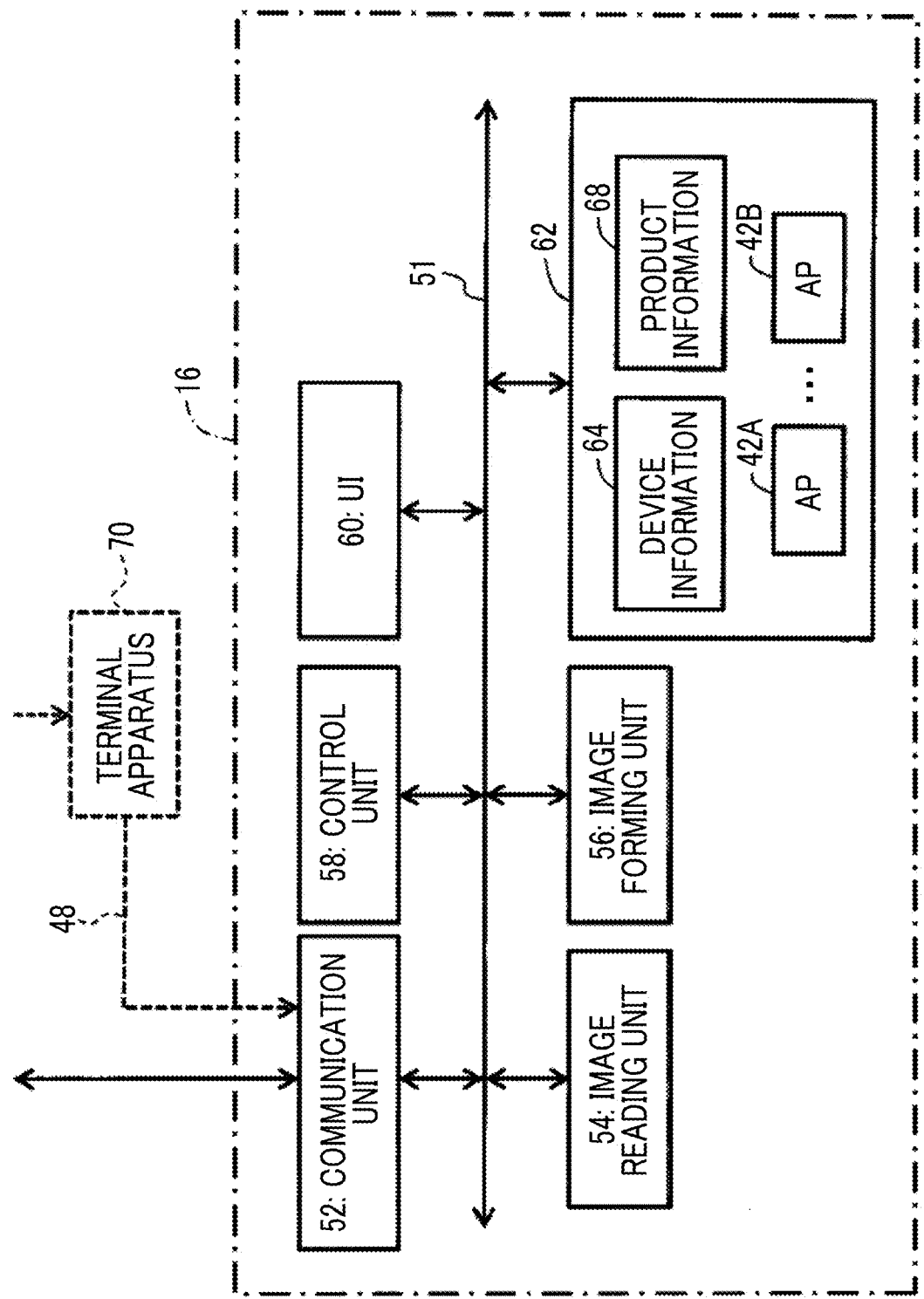
FIG. 2 is a software management system illustrating a configuration example of an image forming device illustrated in FIG. 1.

FIG. 2 illustrates a configuration example of the image forming device 16. Meanwhile, the image forming device 18 illustrated in FIG. 1 has the same configuration as that of the image forming device 16.

In FIG. 2, a communication unit 52, an image reading unit 54, an image forming unit 56, a control unit 58, a User Interface (UI) 60, and the like are connected to an internal bus 51. The communication unit 52 is connected to the LAN 14 illustrated in FIG. 1. The image reading unit 54 reads a physical document to generate an electronic image (electronic document) of the physical document. The image forming unit 56 prints the electronic document on a sheet. The control unit 58 is equivalent to a CPU and various programs. The UI 60 is constituted by, for example, a Liquid Crystal Display (LCD) with a touch sensor. A memory 62 stores device information 64 and product information 68. Further, the plural installed software products (AP) 42A and 42B are stored. The software products 42A and 42B are executed on the control unit 58, and thus a service based on the software products 42A and 42B is provided.

The device information 64, which is information for specifying the device type of the image forming device 16, includes, for example, a device type ID. The device information 64 may include information indicating an installation location. The product information 68, which is information for specifying each software product installed, includes, for example, a product ID.

The software management device according to the exemplary embodiment has a function of specifying each product from a module configuration of each product even in a case where an ID of each product may not be acquired from the image forming device 16. In a case where such a function is used, information (module information) indicating a module configuration is stored in the image forming device 16 as the product information 68. The module information is prepared for each product, and is information for specifying one or plural modules (components) constituting the product. Specifically, the module information includes a module ID, a version, and the like. Naturally, the specification of the product based on the module information is just an example.

The face-to-face selling product 48 is transmitted to the image forming device 16 from a terminal apparatus 70 owned by, for example, a customer engineer, and is installed in the image forming device 16. The face-to-face selling product 48 may be installed in the image forming device 16 through the terminal apparatus 70 from a product selling device on the Internet. After a face-to-face selling contract is established, it is also possible to acquire the face-to-face selling product on line by a user operation by using a configuration to be described later, and to install the acquired face-to-face selling product in the image forming device.

3. Description of Information Management Device

Figure 3:
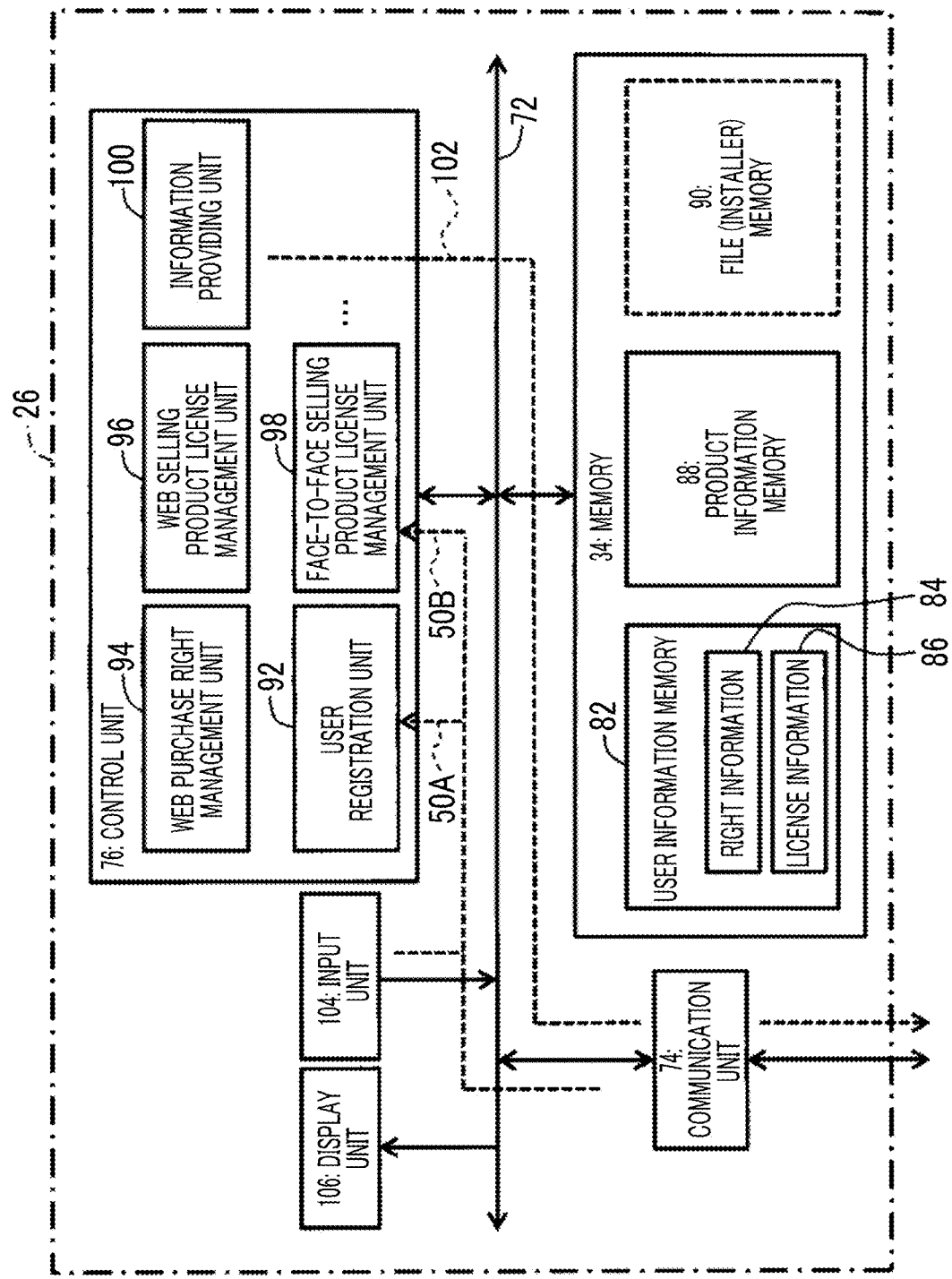
FIG. 3 is a block diagram illustrating a configuration example of an information management device illustrated in FIG. 1.

FIG. 3 illustrates a configuration example of the information management device 26. A communication unit 74, a control unit 76, a memory 34, an input unit 104, a display unit 106, and the like are connected to an internal bus 72. The memory 34 functions as a database as described above, and specifically, includes a user information memory 82, a product information memory 88, and the like.

User information is stored in the user information memory in units of users. The user information includes information for specifying a user and right information 84, and further includes license information 86. The license information may be associated with the user information instead of being included in the user information. The user information will be described later with reference to FIG. 4 and the like. The right information 84 is information indicating whether or not the user has a WEB purchase right.

The license information 86 includes, for example, information for specifying a purchasing user, information for specifying a pay product to be subjected to licensing, and information indicating use conditions and a use state with respect to the pay product. For example, the number of installable times (total), the number of times of installation having been executed so far (actual results), the number of times of installation which is executable from now on (remaining number), and the like may be specified with reference to the license information 86. A product may be managed in accordance with the number of users who use the product or the number of devices that install the product. In addition, the license information may include license keys in units of installation. The license information will be described later in detail with reference to FIG. 5 and the like.

Product information is stored in the product information memory 88 for each product. The product information includes product basic information, product configuration information (module information), and the like. This will be described later with reference to FIG. 7.

A file memory 90 is provided within the information management device 26 as necessary. For example, plural installers corresponding to plural products are stored in the file memory 90. Each of the installer is packaged, and is equivalent to a file. The file memory 90 may be provided on, for example, the product selling device. Information (URL) indicating the location of the installer may be included in the product information.

The control unit 76 is constituted by a CPU and various programs. In FIG. 3, plural functions of the control unit 76 are shown as plural blocks. A user registration unit 92 is a module that performs the registration and management of user information for each user. Specifically, in a case where a request for user registration is made, user information is stored in the user information memory 82 on the assumption that a certain condition is satisfied. The user registration unit may exhibit a user authentication function. A user authentication unit may be provided separately. The user information stored in the user information memory 82 is referred to at the time of user authentication.

A WEB purchase right management unit 94 is a module that gives a WEB purchase right to a registered user and manages the WEB purchase right. For example, in a case where a request for giving a right is made from a registered user and the user satisfies a certain condition, a WEB purchase right is given to the user. It is possible to acquire an on-line selling product from the product selling device only for a user having a WEB purchase right, that is, a user having a purchasable account.

A WEB selling product license management unit 96 functions as a first license information registration section, and a face-to-face selling product license management unit 98 functions as a second license information registration section. The WEB selling product license management unit 96 is a module that registers license information 86 with respect to a WEB selling product in the user information memory 82 when WEB selling is established, and manages the license information 86.

The face-to-face selling product license management unit 98 is module that performs the registration and management of license information 86 with respect to a face-to-face selling product in accordance with an on-line selling product. In this case, to-be-registered information is given to the face-to-face selling product license management unit 98, for example, from the input unit 104 (see reference numeral 50B). The to-be-registered information may be given to the face-to-face selling product license management unit 98 through a network from another device. The to-be-registered information constitutes license information or constitutes the principal portion thereof, and includes, for example, a product ID, a user ID, the number of licenses, and the like. In a case where a purchaser of the face-to-face selling product does not receive user registration, user registration with respect to the purchaser is executed prior to or at the same time as the registration of the license information 86 (see reference numeral 50A). That is, user information is stored on the user information memory 82.

An operation for input to the input unit 104, specifically, user registration and license registration is performed by, for example, a person in charge who sells a product, a system manager who has received a request from the person, and the like. Meanwhile, a user having purchased the product can also input a portion or the entirety of to-be-registered information.

An information providing unit 100 is a module that extracts and integrates information required in managing a software product in a license management device and provides the information to the software management device (see reference numeral 102). The provided information includes user information including, for example, right information, usable product list information, and acquirable product list information. Further, license information is included. The license information may be provided as a portion of the user information or a portion of the usable product list information. The information providing unit 100 is equivalent to a product list generation section from a point of view of the generation and provision of a product list.

The usable product list information is information for specifying one or plural products which are usable by a login user. In a case where the user has a WEB purchase right, usable products include a product (an on-line selling product, a face-to-face selling product) which is a pay product purchased by the user and for which license information has been registered, and a free product. In a case where the user does not have a WEB purchase right, usable products include a product (a registered face-to-face selling product) which is a face-to-face selling product purchased by the user and for which license information has been registered, and a free product.

The acquirable product list information is information for specifying one or plural products capable of being acquired by a login user. In a case where the user has a WEB purchase right, acquirable products include pay products and free products. In a case where the user does not have a WEB purchase right, acquirable products include only free products. There is no difference between the usable product and the acquirable product in a case of focusing on a free product, but there is a difference therebetween in a case of focusing on a pay product. This is because whether a product is a usable product or not is determined according to whether or not license information has been registered in units of products, and whether a product is an acquirable product or not is determined according to the presence or absence of a WEB purchase right in units of users. Naturally, such handling is an example, and product list information may be generated and provided to the license management device without using a concept of a usable product and an acquirable product. In any case, information on a registered face-to-face selling product is provided to the license management device.

As described above, the information management device according to the exemplary embodiment has a configuration in which license information can be registered during or after face-to-face selling with respect to a face-to-face selling product, and a configuration in which a product for which license information has been registered even in a case where a WEB selling right is not present. Thereby, a registered face-to-face selling product is handled in the same manner as an on-line selling product, according to a configuration of product list information transmitted from the information management device to the software management device. In the software management device, the registered face-to-face selling product is determined from the presence or absence of a WEB purchase right, and a certain user operation therefor is admitted. Naturally, information for specifying the face-to-face selling product or the registered face-to-face selling product may be provided from the information management device to the software management device.

Figure 4:
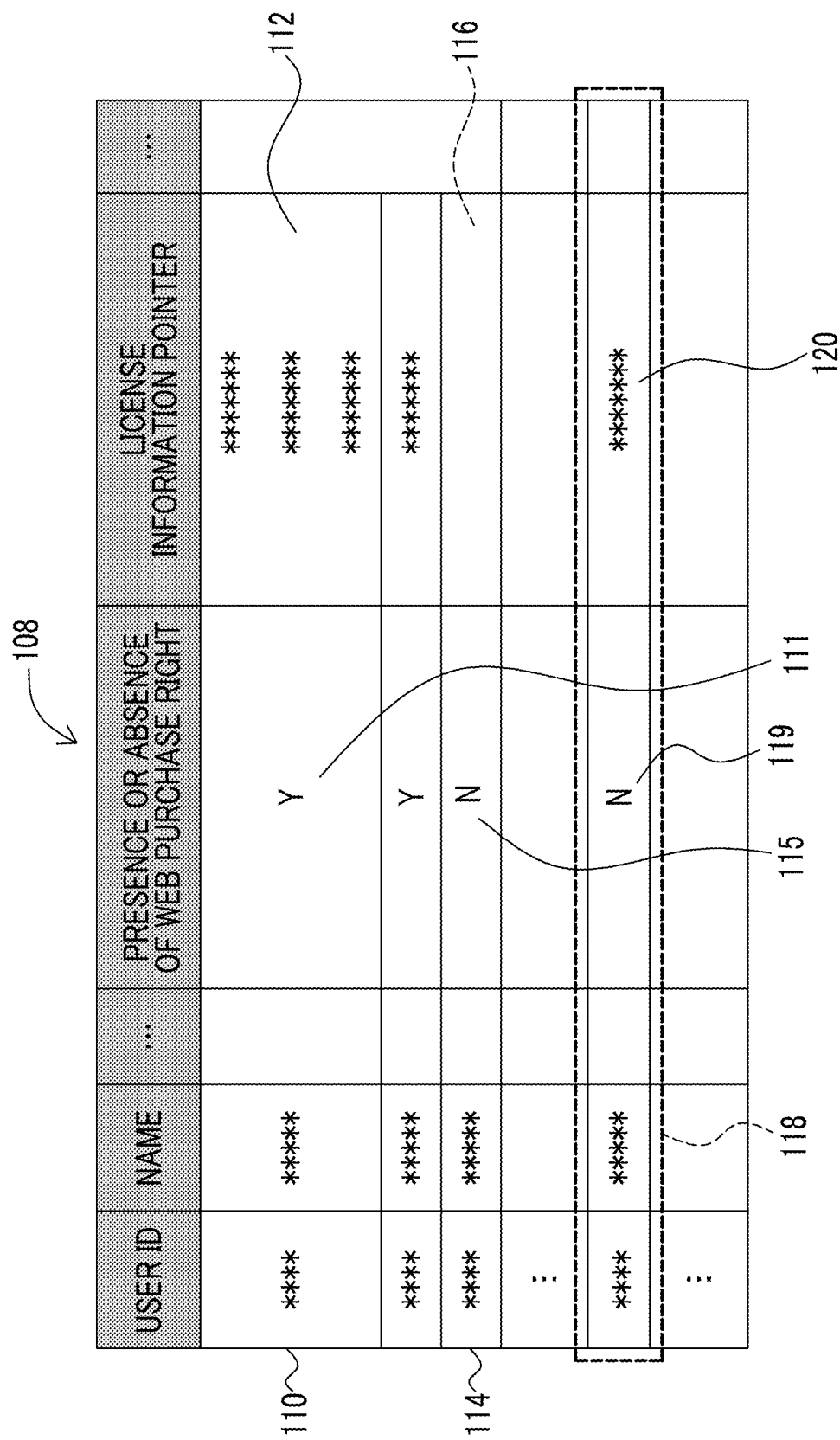
FIG. 4 is a diagram illustrating a configuration example of a user information table.

FIG. 4 illustrates an example of a user information table constructed on a user information memory. A user information table 108 illustrated in FIG. 4 includes plural records 110, 114, and 118. In the example illustrated in the drawing, the records 110, 114, and 118 correspond to the respective users. Each of the records 110, 114, and 118 includes plural pieces of information. Specifically, the record includes user-specific information such as a user ID and a name. In addition, information (right information) indicating the presence or absence of a WEB purchase right is included, and one or plural pointers as links to one or plural pieces of license information are further included in the example illustrated in the drawing. In a case of focusing on the record 110, the registration of presence of a WEB purchase right is included (see reference numeral 111), and plural pointers are included (see reference numeral 112). That is, in a case where a certain user purchases plural pay products, plural pieces of license information are associated with the user. In a case of focusing on the record 114, a WEB purchase right is not registered (see reference numeral 115), and a pointer is not also registered.

On the other hand, in a case of focusing on the record 118, a WEB purchase right is not present (see reference numeral 119), and a pointer is registered (see reference numeral 120). That is, the record 118 is a record corresponding to a face-to-face selling product for which license information has been registered, that is, a registered face-to-face selling product. It is possible to identify the registered face-to-face selling product from the presence or absence of a WEB purchase right and the presence or absence of a pointer. Naturally, a code indicating a type such as an on-line selling product or a face-to-face selling product, and the like may be stored. Further, association with contract information may be performed.

Figure 5:
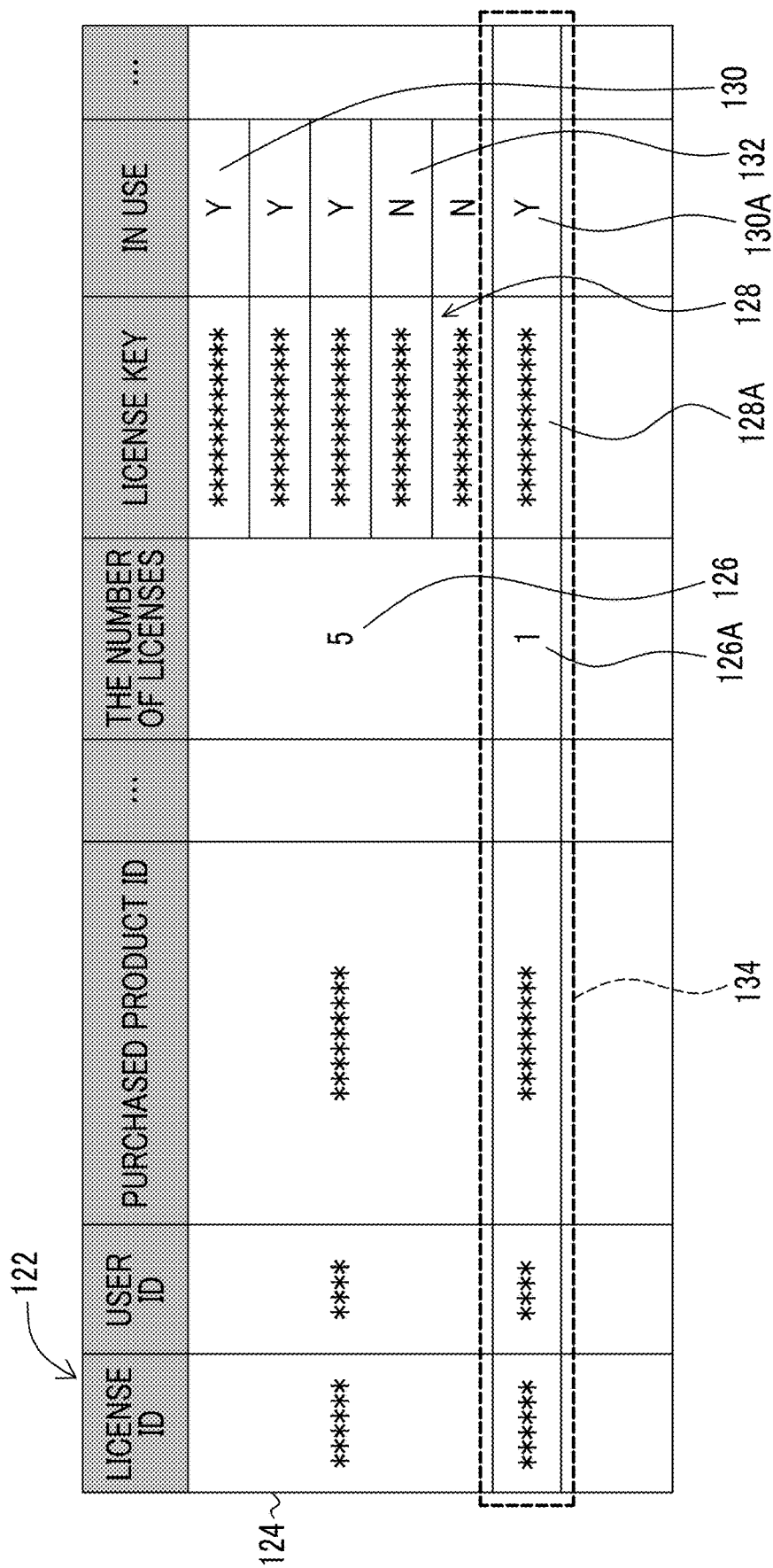
FIG. 5 is a diagram illustrating a configuration example of a license information table.

FIG. 5 illustrates an example of a license information table. A license information management table 122 illustrated in the drawing is constructed on the user information memory included in the information management device. The license information management table 122 illustrated in the drawing is constructed on the user information memory included in the information management device. The license information management table 122 includes plural records 124 and 134. In the example illustrated in the drawing, the records 124 and 134 correspond to the respective purchased products. The above-described pointer is information indicating any one record.

Each of the records 124 and 134 includes a license ID, a user ID, and a purchased product ID, and further includes the number of licenses, license keys corresponding to the number of license, and information indicating whether or not each license key is being used. For example, in a case of focusing on the record 124, the number of licenses is "5" (see reference numeral 126), which indicates that, for example, installation can be performed up to five times. In response to this, five license keys are issued (see reference numeral 128). Each license key is information required in performing installation in the image forming device. In addition, "Y" as a flag indicates that installation has been performed, and "N" as a flag indicates that installation has not yet been performed.

The record 134 is a record corresponding to a face-to-face selling product. The contents thereof are basically the same as those of a record corresponding to a WEB selling product. In the record 134, the number of licenses is "1" (see reference numeral 126A). In response to this, one license key is issued (see reference numeral 128A), and is currently being used (see reference numeral 130A).

FIG. 6 illustrates a modification example of a user information table. A user information table 108A is equivalent to a table obtained by integrating the user information table illustrated in FIG. 4 with the license information table illustrated in FIG. 5. That is, the presence or absence of a WEB purchase right is managed for each user, and a purchased product ID, one or plural license keys, and the like are registered for each product purchased by the user. A record 136 corresponds to a face-to-face selling product. In the record 136, the absence of a WEB purchase right is registered, but a purchased product ID, a license key corresponding to the purchased product ID, and the like are registered. Meanwhile, "unlimited" may be registered as the number of licenses. In addition, information such as a license form may be registered in each record. In addition, information for defining the number of licenses may be registered.

FIG. 7 illustrates a configuration example of a product information table. A product information table 142 illustrated in the drawing is constructed on a product information memory in an information management device. The product information table 142 substantially includes product basic information and product configuration information. The product basic information includes a product ID, a version, the year, month, and day of release, a target device type list, and the like for each product. The target device type list is information for specifying one or plural device types that may serve as an installation destination of the product, and specifically, includes one or plural device type IDs.

The product configuration information is information for specifying a module configuration for each product. One or plural pieces of module information are managed for each product, and relation information for specifying mutual relations between plural modules is also managed. Examples of the mutual relations include an "or" relation, an "and" relation, and the like. Specifically, the module information is constituted by a module ID, a version, a target apparatus list, and the like in the example illustrated in the drawing. In the software management device, one or plural products installed in the device are specified by butting the product configuration information for each product which is received from the information management device and the module information received from the device. Naturally, in a case where a product ID of a product installed in the image forming device is managed on the device, the product ID may be referred to.

Figure 8:
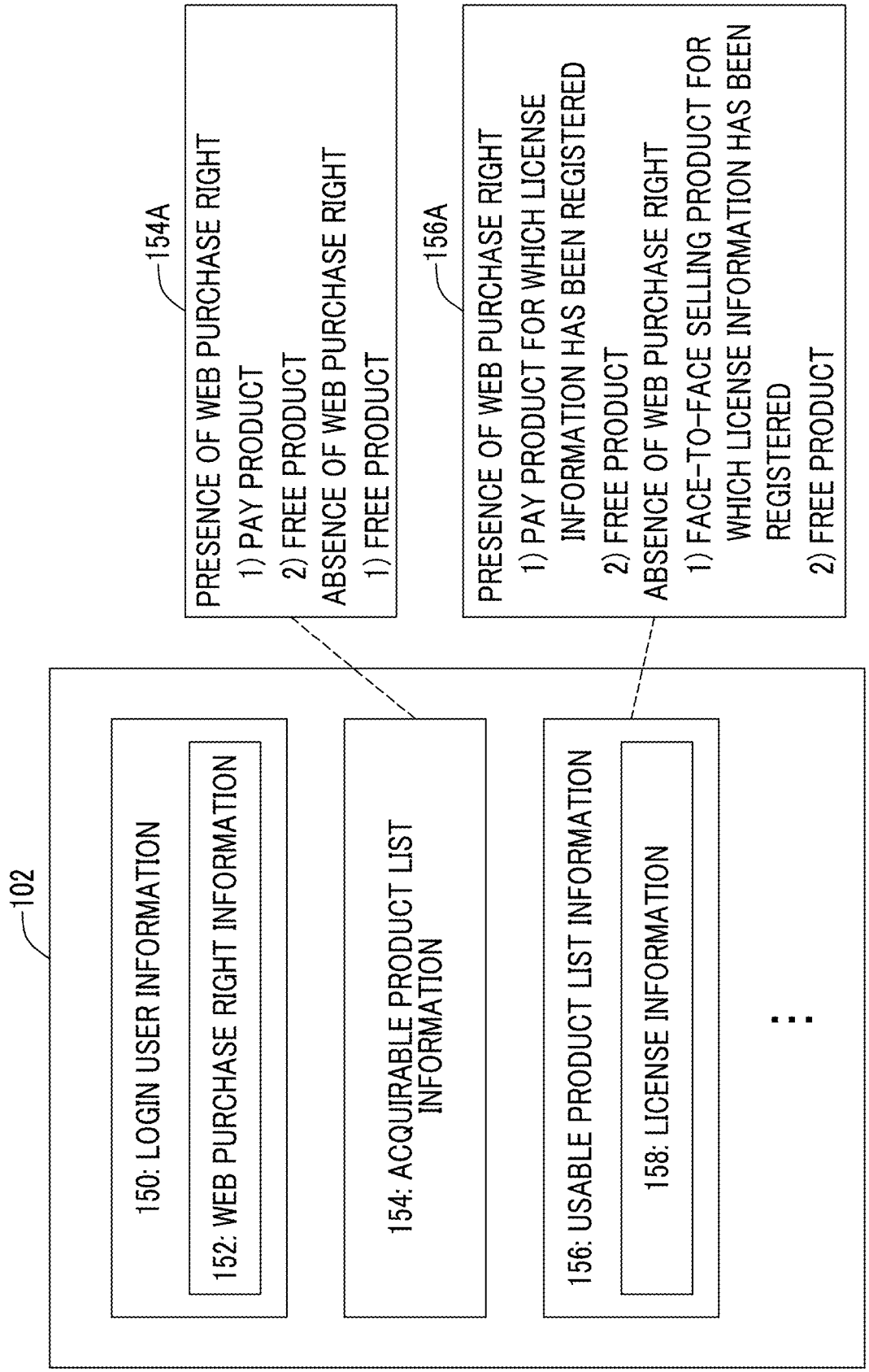
FIG. 8 is a diagram illustrating an example of information provided from the information management device to a software management device.

FIG. 8 illustrates a configuration example of information which is provided from the information management device to the software management device. In the configuration example illustrated in the drawing, the information 102 provided includes login user information 150, acquirable product list information 154, and usable product list information 156. The login user information 150 is information on a user having been subjected to user authentication, includes a user ID and further includes WEB purchase right information 152. The login user information is information indicating whether or not the user has a WEB purchase right. The acquirable product list information 154 is information for specifying a pay product and a free product in a case where the user has a WEB purchase right (see reference numeral 154A), and is information for specifying a free product in a case where the user does not have a WEB purchase right (the same).

In a case where the user has a WEB purchase right, the usable product list information 156 is information for specifying a pay product for which license information has been registered, and a free product (see reference numeral 156A). The pay product for which license information has been registered includes a WEB purchase product for which license information has been registered, and a face-to-face selling product (a registered face-to-face selling product) for which license information has been registered. In a case where the user does not have a WEB purchase right, the usable product list information 156 is information for specifying a face-to-face selling product for which license information has been registered, and a free product (the same). Even in a case where the user does not have a WEB purchase right, the usable product list information includes information for specifying a registered face-to-face selling product, and thus it is possible to display the registered face-to-face selling product in the software management device, and to receive a certain user operation therefor.

In the example illustrated in the drawing, the usable product list information 156 also includes license information 158. The license information 158 is information capable of specifying the number of licenses, the number of licenses which is being used, the number of licenses which is not used, and the like, and may include information such as a license key.

4. Description of Software Management Device

Figure 9:
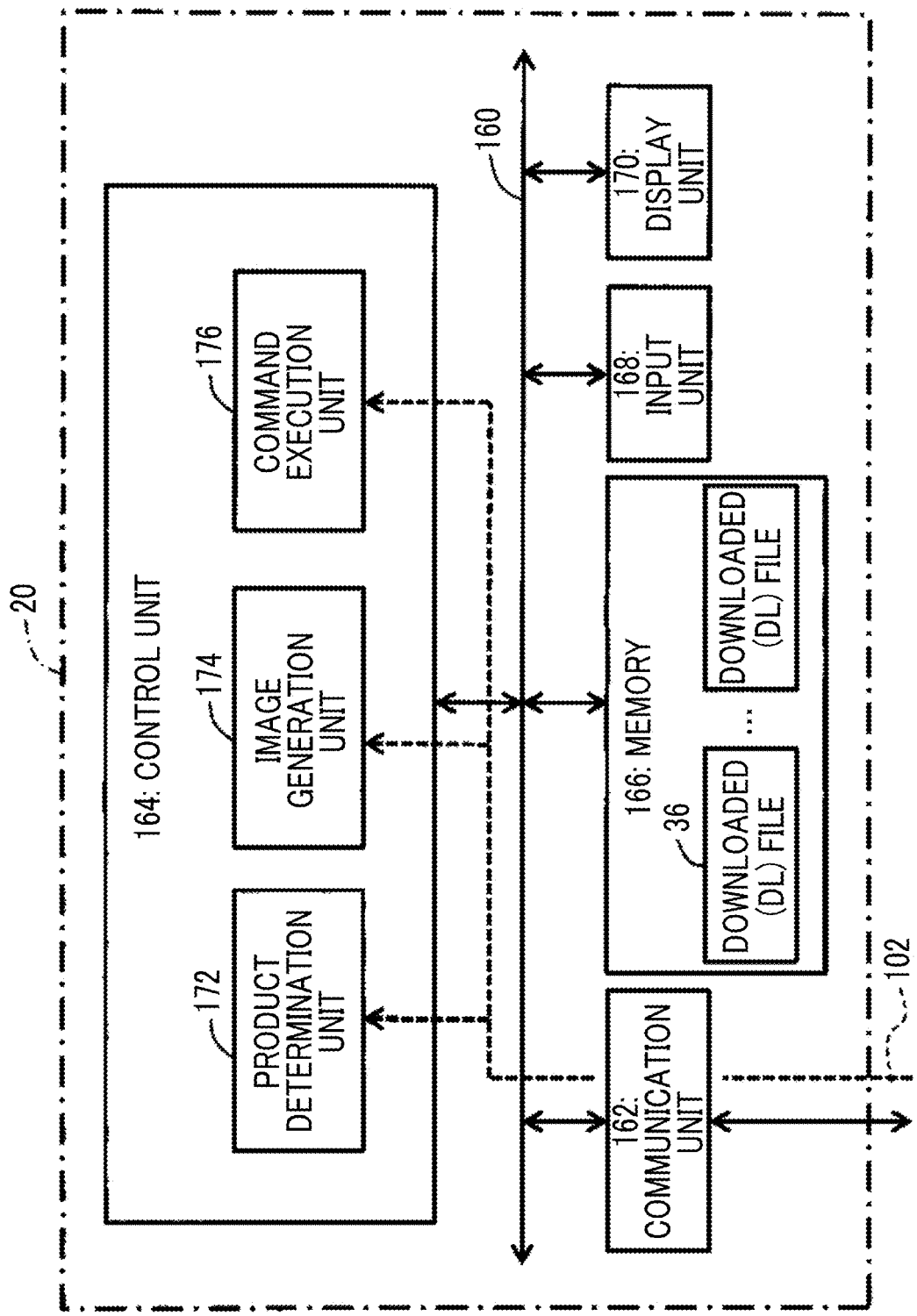
FIG. 9 is a block diagram illustrating a configuration example of the software management device.

FIG. 9 illustrates a configuration example of the software management device. The software management device 20 includes an internal bus 160, and a communication unit 162, a control unit 164, a memory 166, an input unit 168, a display unit 170, and the like are connected to the internal bus 160. The communication unit 162 connects a LAN and the internal bus 160 to each other. The control unit 164 is constituted by a CPU and various programs. The control unit 164 or a command execution unit 176 included in the control unit functions as a controller. The display unit 170 functions as a display. In FIG. 9, plural functions of the control unit 164 are shown as plural blocks.

The product determination unit 172 is a module that specifies one or plural products installed in the image forming device, on the basis of product information obtained from the image forming device for each image forming device. In a case where only module information is obtained as product information, one or plural products installed in the image forming device are specified by butting the module information and product configuration information obtained from the information management device.

The image generation unit 174 functions as an image generation section or a display processing section. The image generation unit 174 generates a usable product list on the basis of usable product list information, and executes control of displaying the generated usable product list on the display unit 170. In addition, the image generation unit also performs control of creating an acquirable product list on the basis of acquirability product information and displaying the created acquirable product list on the display unit 170. In addition, the image generation unit performs control of creating an installed product list installed in the selected image forming device on the basis of the usable product list information or license information included in the usable product list information, and displaying the created installed product list on the display unit 170. Further, the image generation unit 174 also performs control of creating a sold product list on the basis of the usable product list information or license information included in the usable product list information, and displaying the created sold product list on the display unit 170. In addition, the image generation unit 174 has a function of displaying various images in accordance with a user's request. Meanwhile, the information 102 received from the information management device in order to perform software management is referred to by the image generation unit 174 and the command execution unit 176. The information is also referred by the product determination unit 172 as necessary.

In this manner, registered face-to-face selling products owned by a user are displayed as a usable product, an installed product, and a sold product even in a case where the user does not have a WEB purchase right. Thereby, the user can confirm the presence of the user's product, and thus the user feels easy.

The command execution unit 176 is a module that receives a user operation and executes a command designated by the user operation. The range or type of receivable user operation fluctuates depending on the presence or absence of a WEB purchase right.

In a case where the user has a WEB purchase right, plural types of operations such as an installer downloading operation, a product installation operation, a product updating operation, a product uninstallation operation, a license additional purchase operation, a WEB selling product purchase operation, and a purchase page transition operation are all received with respect to a pay product. On the other hand, in a case where the user does not have a WEB purchase right, plural types of operations with respect to a pay product (except for a registered face-to-face selling product) are all set to be out-of-reception targets. Actually, information indicating a pay product is not displayed, and an operation element such as an icon is not also displayed with respect to a pay product. Meanwhile, with regard to a free product, an installer downloading operation, a product installation operation, a product updating operation, and a product uninstallation operation are received, regardless of the presence or absence of a WEB purchase right. Naturally, an operation related to purchase is an out-of-reception target.

Even in a case where the user does not have a WEB purchase right, some of plural types of operations are received with respect to a registered face-to-face selling product. Specifically, operations of giving instructions for installer downloading, product installation, product updating, and product uninstallation are received. However, an operation concerned with purchase (a button operation for performing purchase, an operation of giving instruction for displaying a page for performing purchase, and the like) is set to be an out-of-reception target. Actually, a button itself for such an operation is set to be in a non-display mode.

In this manner, even in a case where the user does not have a WEB purchase right, a certain user operation with respect to a registered face-to-face selling product is admitted, and thus the user does not feel uncomfortable in performing handling with respect to the user's product. In this case, a user operation related to purchase is set to be an out-of-reception target with respect to the registered face-to-face selling product, and thus an operation deviating from the user's right is not received.

A downloaded file (installer) and the like are stored in the memory 166. In addition, the information 102 obtained from the information management device is stored in the memory 166 as necessary. The input unit 168 is constituted by an input device such as a keyboard or a mouse. The display unit 170 is constituted by a display such as an LCD.

5. Description of Operation

Figure 10:
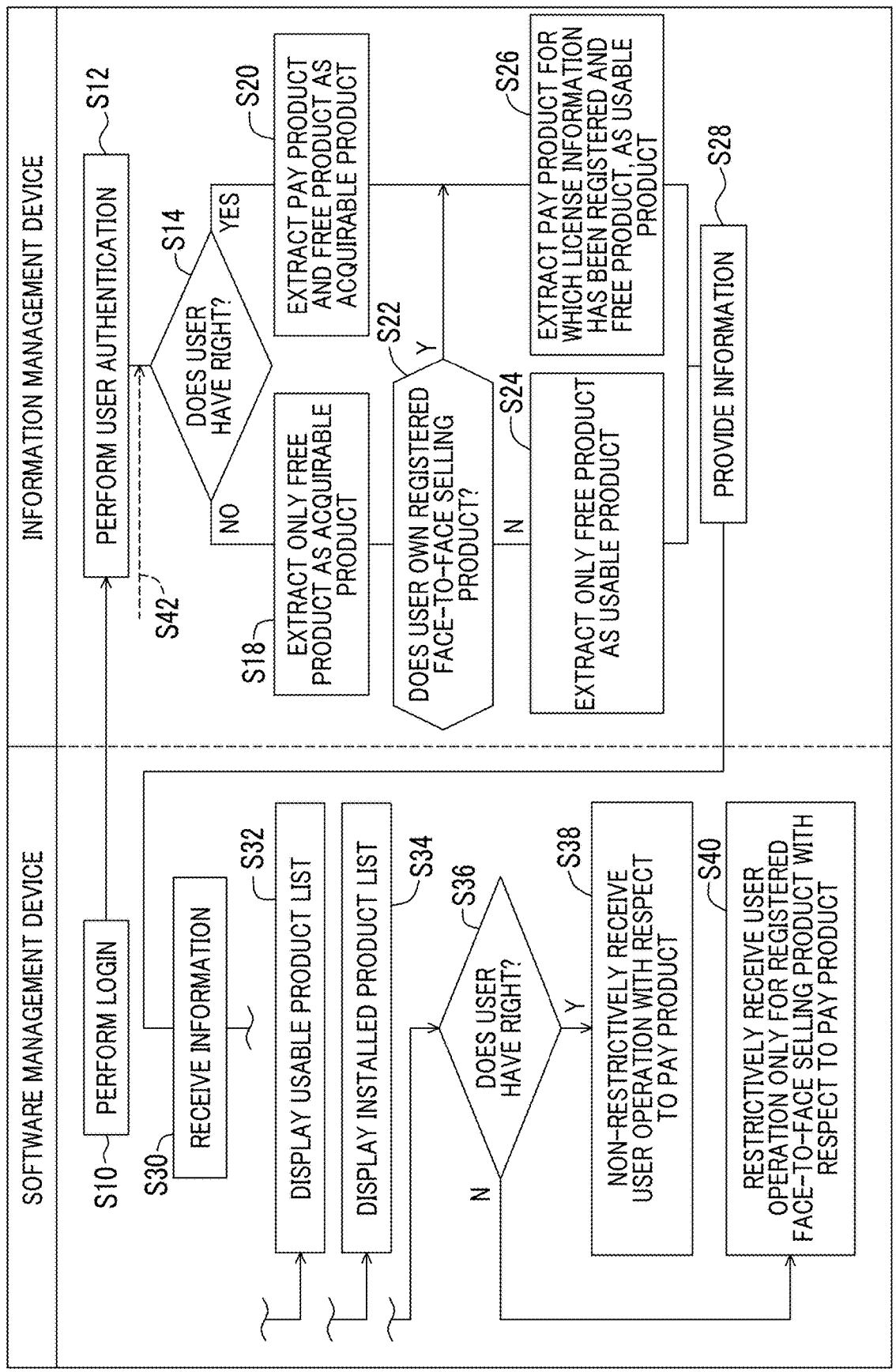
FIG. 10 is a flowchart illustrating an operation example of a software management system.

Next, an operation example of the software management system will be described with reference to FIG. 10. The operation of the software management device is shown on the left side of FIG. 10, and the operation of the information management device is shown on the right side of FIG. 10.

In S10, a login operation is performed by a user of the software management device. In S12, user authentication is executed in the information management device. In this case, a user information table on the memory is referred to. After the user authentication is established, the user information table on the memory is referred to and it is determined whether or not the authenticated user has a WEB purchase right in S14.

Both S18 and S20 are steps of generating an acquirable product list. In a case where the user has a WEB purchase right, pay products and free products are all extracted, and a product list showing the products is generated. On the other hand, in a case where the user does not have a WEB purchase right, only a free product is extracted as an acquirable product in S18. When the extraction is performed, a product information memory is referred to.

In a case where the user does not have a WEB purchase right, it is determined in S22 whether or not the user owns a registered face-to-face selling product. Actually, it is determined whether the user who does not have a WEB purchase right owns a product accompanied by the registration of license information. The product is nothing but a registered face-to-face selling product. In S22, user information and license information are referred to.

In a case where the user has a WEB purchase right, a product (pay product) accompanied by the registration of license information and a free product are extracted as usable products in S26. In a case where the user does not have a WEB purchase right (YES in S22), a registered face-to-face selling product and a free product are extracted in S26. On the other hand, only a free product is extracted as a usable product in S24. Meanwhile, in this case, the acquirable product list and the usable product list are actually consistent with each other, the execution result in S18 may be adopted in the step of S24.

In S28, information required in software management is provided from the information management device to the software management device. The information includes acquirable product list information, usable product list information, user information (right information), and license information as described above.

In the software management device, the above-described information is received in S30. Steps described below are executed in accordance with the user's operation or the user's selection on the screen. In a case where the user selects the display of the usable product list, a usable product list generated on the basis of the information received from the information management device is displayed in S32. In a case where the registered face-to-face selling product corresponds to a usable product, a usable product list including an item indicating the registered face-to-face selling product is displayed. In a case where the user selects the display of an installed product list, an installed product list generated on the basis of the information received from the information management device and the information acquired from the image forming device is displayed in S34. In a case where the registered face-to-face selling product corresponds to an installed product, an installed product list including an item indicating the registered face-to-face selling product is displayed. In addition, a sold product list and an acquirable product list may be displayed in accordance with the user's selection.

S36 to S40 are a series of steps of managing a user operation with respect to a pay product, and it is determined in S36 whether or not the user has a WEB purchase right, on the basis of the information received from the information management device. In a case where the user has a WEB purchase right, plural types of operations with respect to the pay product are all permitted in S38. For example, an operation button for giving an instruction for displaying a page for performing WEB purchase, an operation button for giving an instruction for additionally purchasing a license, and the like are displayed, and operations therefor are received as effective operations.

On the other hand, in a case where the user does not have a WEB purchase right, a user operation is restrictively received only for the registered face-to-face selling product among pay products in S40. That is, the above-described plural types of operations are all set to be out-of-reception targets with respect to pay products other than the registered face-to-face selling product. An operation button required to perform such an operation is set to be in a non-display mode, in the first place. With regard to the registered face-to-face selling product, some of the above-described plural types of operations are received. A portion of the remaining operations is set to be an out-of-reception target. Examples of operations to be received include an installer downloading operation, a product installation operation, a product updating operation, and a product uninstallation operation. Examples of operation not to be received include an operation of giving an instruction for displaying a page for performing WEB purchase, an operation of giving an instruction for additionally purchasing a license, and the like. A button itself for performing an operation concerned with purchase is set to be in a non-display mode, in the first place.

As described above, with regard to a face-to-face selling product, in a case where a certain condition (registration of license information) is satisfied considering that the face-to-face selling product is owned by the user, the face-to-face selling product is displayed on the screen for performing software management and a certain operation for the product is admitted. Meanwhile, as shown in S42, in a case where information updating is required, S14 and the subsequent steps are executed again.

6. Description of Image

Hereinafter, some images displayed in the software management device will be described with reference to FIGS. 11 to 15.

Figure 11:
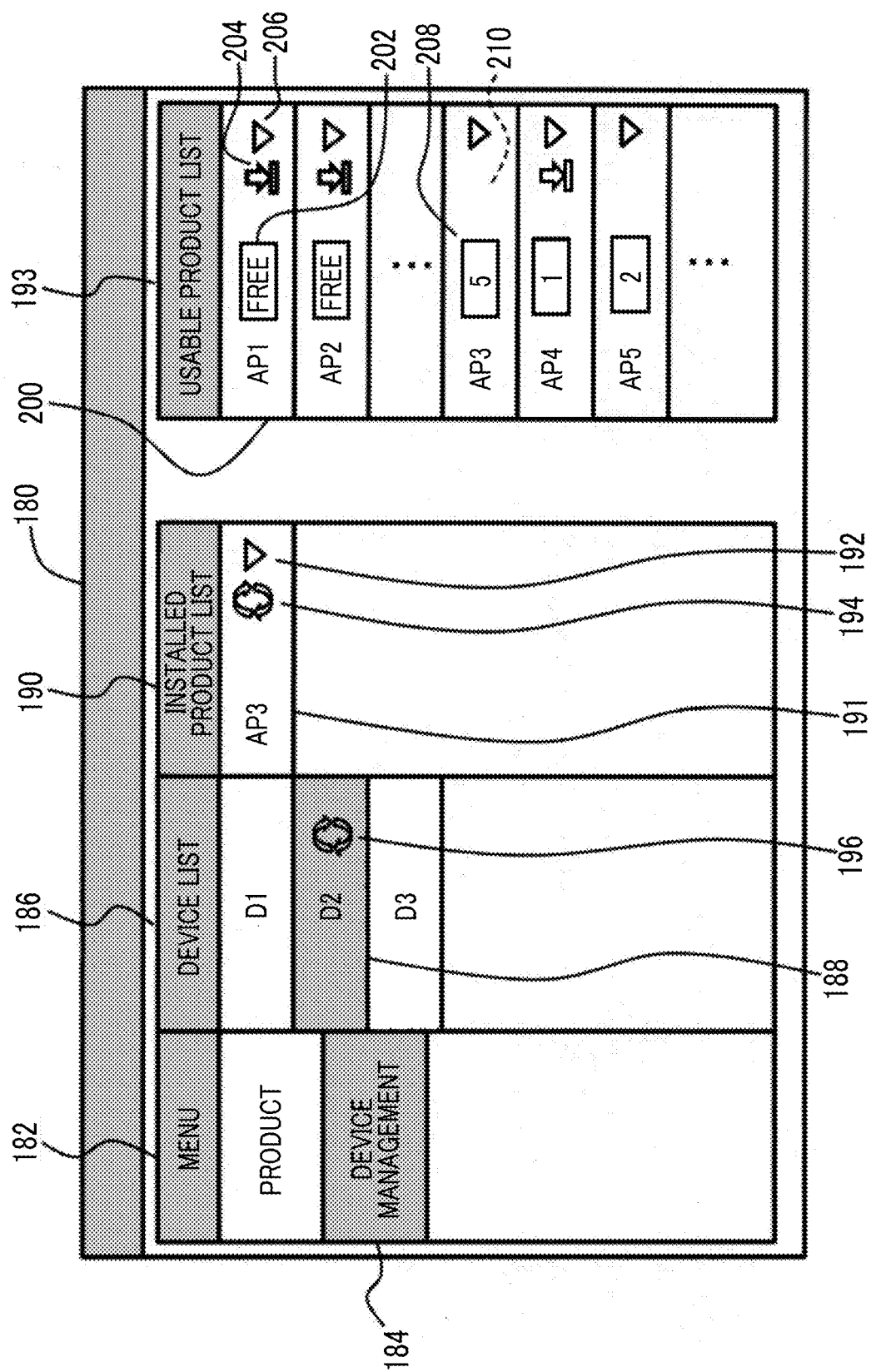
FIG. 11 is a diagram illustrating an image which is displayed to a user who has a WEB purchase right.

An image 180 illustrated in FIG. 11 is displayed for a user having a WEB purchase right. A menu column 182 is displayed on the left side of an image 180. The menu column 182 includes two items (buttons). In the example illustrated in the drawing, device management is selected as indicated by reference numeral 184. In response to this, a device list 186 is displayed on the left side of the menu column 182. The device list 186 includes plural items corresponding to plural image forming devices specified by retrieval. In the example illustrated in the drawing, an item 188 is selected, and an installed product list 190 is displayed on the right side of the device list. The installed product list includes an item 191 indicating an installed product. The product is a product which is sold on line. The item 191 includes a maintenance button 192. The maintenance button 192 is a button which is operated prior to an operation such as updating or uninstallation in a case where the operation is performed on the product. A mark 194 indicating the necessity of updating is displayed adjacent to the maintenance button 192. A mark 196 indicating the necessity of updating is also displayed in the item 188.

A usable product list 193 is displayed on the right side of the image 180. The usable product list 193 includes plural items 200. In the example illustrated in the drawing, each item corresponds to a pay product or a free product. A mark 202 indicates a free product. A mark 204 is a downloading button. A mark 206 is the above-described maintenance button. A numeral specified by reference numeral 208 indicates the number of licenses with respect to a pay product, and particularly, the number of remaining licenses (the number of installable times). In a case of a product for which downloading has been completed, a downloading mark is set to be in a non-display mode (see reference numeral 210).

Figure 12:
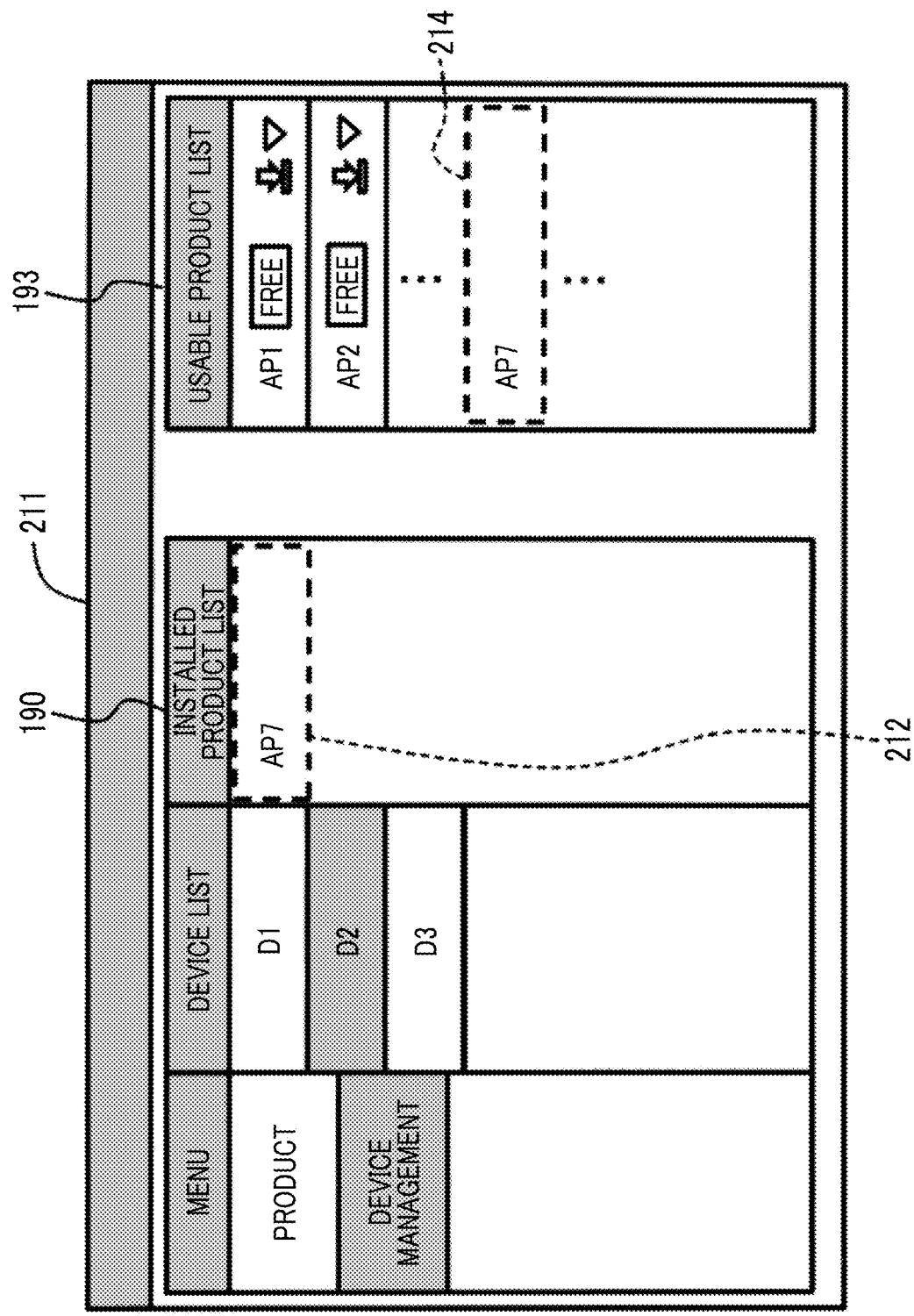
FIG. 12 is a diagram illustrating an image, as a comparative example, which is displayed to a user who does not have a WEB purchase right.

An image 211 illustrated in FIG. 12 is displayed for a user who does not have a WEB purchase right, and is equivalent to a comparative example. In the image 211, no item is displayed in an installed product list, and an item 212 corresponding to a face-to-face selling product is not displayed even in a case where the face-to-face selling product is actually installed. Similarly, the usable product list 193 includes plural items corresponding to plural free products, but an item 214 corresponding to a face-to-face selling product is not displayed in the usable product list 193 even in a case where the face-to-face selling product is purchased. In the comparative example, displayed contents are not consistent with the actual condition, which makes it easier for the user to feel uneasy and misunderstand and results in the user's discomfort, for example, being incapable of performing an operation, such as updating, with respect to a product owned by the user.

Figure 13:
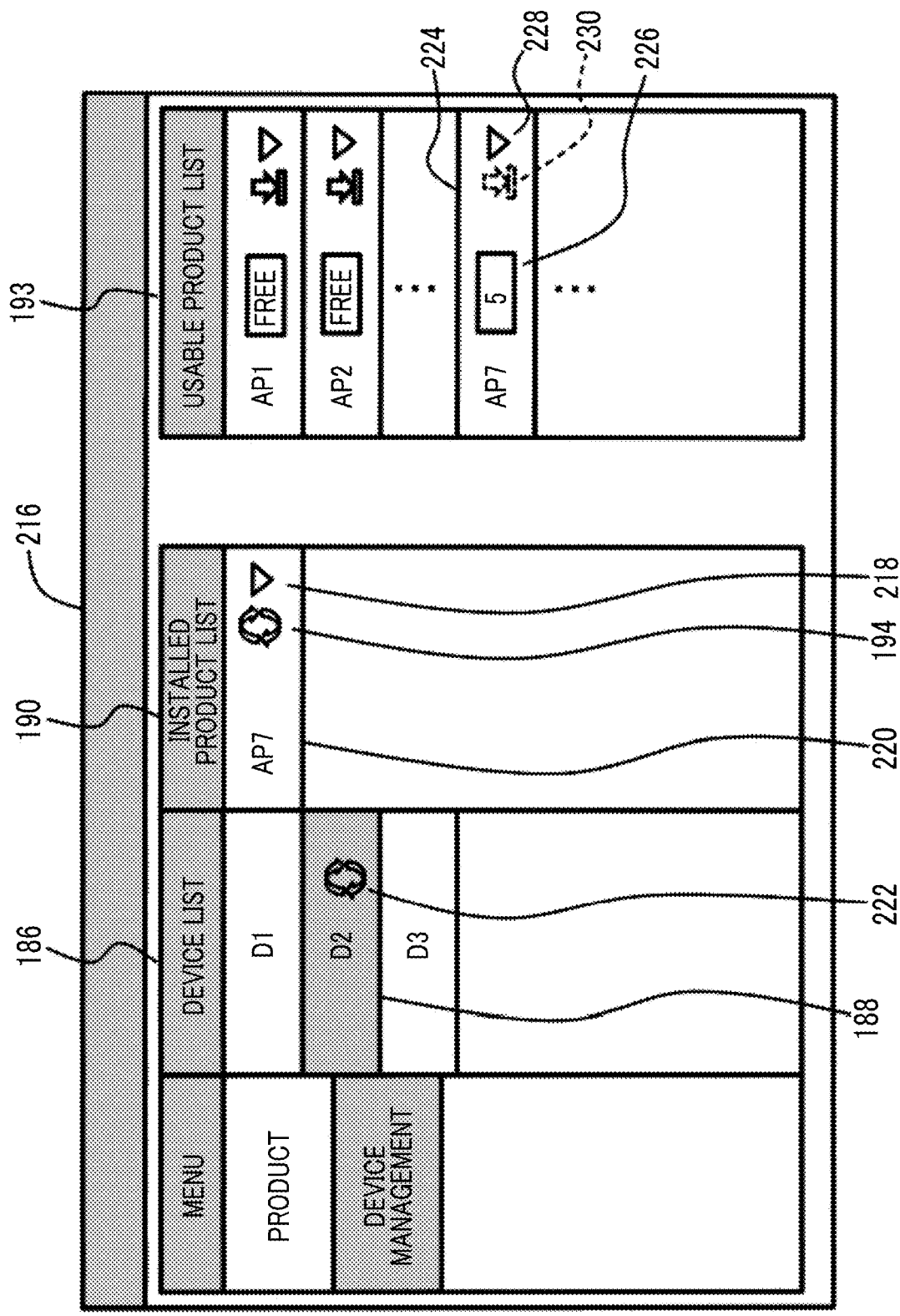
FIG. 13 is a diagram illustrating an image, according to the exemplary embodiment, which is displayed to a user who does not have a WEB purchase right.

An image 216 illustrated in FIG. 13 is an image according to the exemplary embodiment, and is displayed for a user who does not have a WEB purchase right. In the image 216, an item 220 corresponding to a registered face-to-face selling product is included in the installed product list 190, unlike the image 211 illustrated in FIG. 12. The item 220 includes a maintenance button 218, an updating operation and an uninstallation operation with respect to the registered face-to-face selling product can be performed through a menu displayed by the operation of the maintenance button. In the item 220, a mark 194 indicating the generation of an updated version and for recommending updating is displayed. Further, the same mark 222 is also displayed in the item 188 corresponding to a device which is an installation destination. Further, the usable product list 193 includes an item 224 corresponding to a registered face-to-face selling product. The item 224 includes a maintenance button 228. The maintenance button 228 is a button which is operated prior to an operation such as updating or uninstallation, in a case where the operation is performed on a product as described above. In the example illustrated in the drawing, a downloading button 230 is not displayed adjacent to the maintenance button 228. In a case where downloading for a registered face-to-face selling product has not been completed, the downloading button 230 is displayed in the item 224 corresponding to the registered face-to-face selling product. In a case where the downloading button 230 is operated, an installer corresponding to the registered face-to-face selling product is downloaded to the software management device, which leads to a state where installation can be performed. In the item 224, a numeral specified by reference numeral 226 indicates the number of licenses, and particularly, the number of remaining licenses (the number of installable times).

As described above, even in a case where the user does not have a WEB purchase right, a registered face-to-face selling product is handled in the same manner as an on-line selling product in performing display in the software management device, and the registered face-to-face selling product is handled in accordance with the on-line selling product in performing an operation in the software management device.

Figure 14:
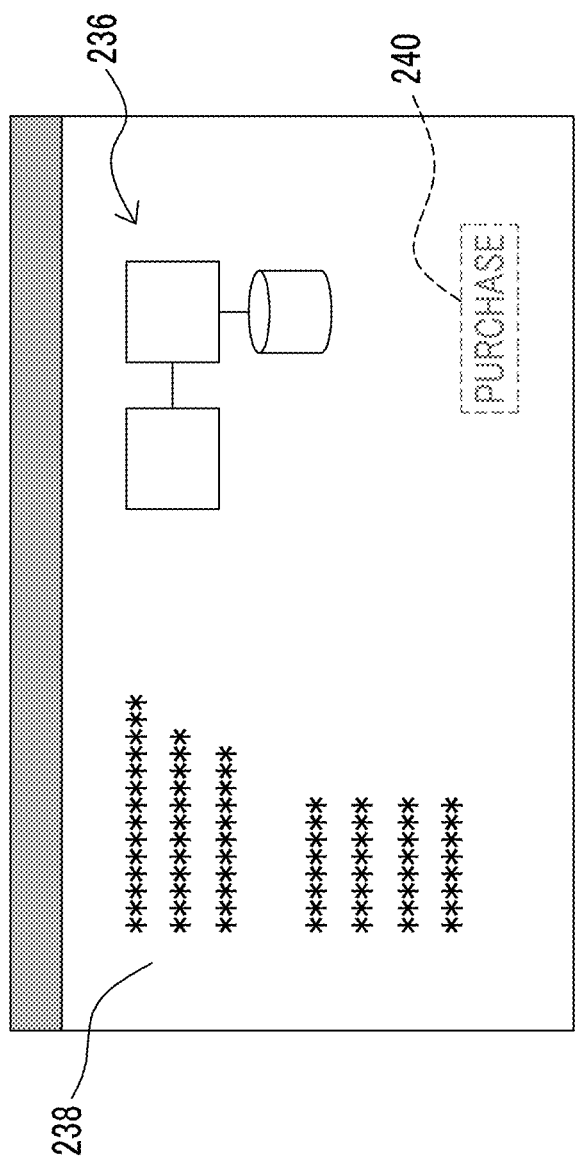
FIG. 14 is a diagram illustrating another image according to the exemplary embodiment.

FIG. 14 illustrates another image according to the exemplary embodiment. The image is equivalent to a product introduction page, and is displayed on a screen of the license management device. In a case where a user operation for requesting transition to the product introduction page while selecting a product is performed on the screen of the software management device, the product introduction page as illustrated in the drawing is displayed. The product introduction page includes a sentence 238 and a FIG. 236 for introducing the product, in the example illustrated in the drawing.

In a case where the user has a WEB purchase right, a user operation for requesting transition to the product introduction page is received with respect to all of pay products and free products. In a case where the user does not have a WEB purchase right, a user operation for requesting transition to the product introduction page is received with respect to only free products. Prior to this, an acquirable product list constituted by plural items corresponding to plural free products is displayed.

In a case where the user does not have a WEB purchase right, a user operation for requesting transition to the product introduction page may be received with respect to a registered face-to-face selling product in addition to the free products. However, in this case, a purchase button 240 included in a product introduction page of a pay product is not displayed. The purchase button is a button for purchasing a product or a button for additionally purchasing a license. In this manner, in a case where the user does not have a WEB purchase right, some of user operations with respect to the registered face-to-face selling product are restricted. The transition itself to the product introduction page with respect to the registered face-to-face selling product may be restricted.

FIG. 15 illustrates still another image according to the exemplary embodiment. The image includes a purchased product list 244, and is displayed on the screen of the license management device. In a case where the user has a WEB purchase right, all purchased pay products are set to be objects to be displayed. In this case, a product name, license information, a purchase button (a button for additionally purchasing a license), and the like are displayed for each pay product. In a case where the user does not have a WEB purchase right and the user owns a registered face-to-face selling product, only the registered face-to-face selling product is set to be an object to be displayed. In this case, information denoted by reference numeral 246 is displayed with respect to the registered face-to-face selling product. The information includes a product name, license information, and the like, but a purchase button (a button for additionally purchasing a license) 248 is not displayed. Since the user does not have a WEB purchase right, a user operation concerned with purchase is restricted. The license information includes a numeral indicating a total number of licenses, a numeral indicating the number of licenses being in use, a numeral indicating the number of remaining licenses, and the like. Each numeral typically indicates the number of times of installation.

In a case where a face-to-face selling product purchased by the user is not displayed at all in the purchased product list provided to the user, there is a concern that the user may feel uneasy. In response to this, according to the exemplary embodiment, a face-to-face selling product can be included in the purchased product list on the assumption that a certain condition, such as the registration of license information, is satisfied, and thus it is possible to prevent the user feeling uneasy. Moreover, license information with respect to a face-to-face selling product is provided to the user, similar to an on-line selling product, and thus the user can appropriately perform software management.

7. Arrangement of Disclosed Matters

This application discloses a software management device including a display and a controller. In the exemplary embodiment, the display unit within the software management device functions as a display, and the control unit within the software management device or the command execution unit included in the control unit functions as a controller.

The above-described display is a section that displays a product list showing software products satisfying a predetermined condition, and is a section that displays a product list including items showing a registered face-to-face selling product in a case where the registered face-to-face selling product which is sold on a face-to-face basis and for which license information has been registered satisfies the predetermined condition.

The above-described predetermined condition is a condition for narrowing objects to be displayed as a product list. Naturally, the objects may vary depending on the type of product list to be displayed. In the exemplary embodiment, for example, a usable product list, a purchased product list, an installed product list, and the like are selectively or simultaneously displayed. The objects to be displayed may vary depending on whether or not a user has an on-line purchase right. For example, an on-line selling product and a registered face-to-face selling product which are purchased by the user are set to be objects to be displayed in a case where the user has an on-line purchase right, and a registered face-to-face selling product is set to be an object to be display in a case where the user does not have an on-line purchase right. In the exemplary embodiment, a usable product list and the like are generated on the information management device, and an installed product list is generated on the software management device. In a case where a product list including an item indicating a registered face-to-face selling product is displayed in the software management device regardless of the location of generation of the product list, it is possible to provide information suitable for the recognition thereof to the user.

In the exemplary embodiment, an on-line purchase right is a right to purchase in units of users. The registration of license information is equivalent to the registration of a use right in units of pay products. The registration of license information can also be understood as the registration of a product itself. The license information may include information for specifying a user who has a use right or owns a product.

The above-described controller is a section that non-restrictively receives a user operation with respect to an on-line selling product which is a software product sold online in a case where the user has an on-line purchase right, and restrictively receives a user operation with respect to a registered face-to-face selling product in a case where the user does not have an on-line purchase right.

For example, the controller receives all of plural types of operations as user operations with respect to an on-line selling product and a registered face-to-face selling product in a case where the user has an on-line purchase right, and receives some of the plural types of operations as a user operation with respect to a registered face-to-face selling product in a case where the user does not have an on-line purchase right. In other words, the controller does not receive an operation for on-line purchase in a case where the user does not have an on-line purchase right.

Here, control that does not receive an operation includes control of disabling the operation itself from being performed, and specifically, includes a mode in which a button for the operation is not displayed on the screen, a mode in which a button for performing transition to the screen for the operation is not displayed, and the like. Further, the control also includes a mode in which the operation is invalidated by a warning being displayed in a case where the operation is performed. In this manner, the controller may function as a display controller or a screen operation controller.

In a case where the user does not have an on-line purchase right, it is not basically necessary to admit an operation with respect to a pay product. However, a face-to-face selling product is a product which has already been purchased by the user, and thus it is, for example, desired that a certain operation therefor is admitted. Consequently, in the above-described configuration, a certain operation is admitted with respect to a registered face-to-face selling product for which license information has been registered. The operation includes a downloading operation, an installation operation, an updating operation, and an uninstallation operation in the exemplary embodiment. The operation does not include an operation concerned with or related to purchase. Consistency with not having an on-line purchase right is achieved by the restriction of the operation.

From another point of view, the software management device changes a range of a product to be displayed and a range of a receivable operation, in accordance with the registration of a human and the registration of a product.

In addition, this application discloses a software management system including a software management device connected to an image forming device, and an information management device connected to the software management device. The information management device is a device including a license information memory and a product list generation section. The software management device is a device including a display and a controller.

The above-described license information memory is a memory in which license information of an on-line selling product is registered in a case where a software product for an image forming device is sold on line, and license information of a face-to-face selling product is registered in a case where a software product for an image forming device is sold on a face-to-face basis and to-be-registered information on the software product is input.

In the exemplary embodiment, a first license information registration unit and a second license information registration unit are provided with the information management device in order to manage license information. The first license information registration unit is a section that registers license information of an on-line selling product in the license information memory during on-line selling of the on-line selling product. The second license information registration unit is a section that registers license information of a face-to-face selling product in the license information memory on the basis of to-be-registered information during or after the selling of the face-to-face selling product. In the exemplary embodiment, the first license information registration unit is configured as a WEB selling product license management unit, and the second license information registration unit is configured as a face-to-face selling product license management unit.

The above-described product list generation section is a section that generates a product list including an item indicating a software product purchased by the user, and the product list generation section is a section that generates a product list including an item indicating an on-line selling product in a case where the user purchases the on-line selling product, and generates a product list including an item indicating a registered face-to-face selling product in a case where the user purchases the registered face-to-face selling product for which the license information has been registered. The product list generation section is equivalent to the information providing unit included in the information management device in the exemplary embodiment.

According to the above-described information management device, a face-to-face selling product is handled in accordance with an on-line selling product at the time of the generation of a product list, with a configuration in which license information is registered and managed with respect to the face-to-face selling product as a premise.

The above-described display is a section that displays a product list, and the above-described controller is a section that receives all of plural types of operations as a user operation with respect to an on-line selling product in a case where the user has an on-line purchase right, and receives some of the plural types of operations as a user operation with respect to a registered face-to-face selling product in a case where the user does not have an on-line purchase right.

According to the above-described software management device, a registered face-to-face selling product can be included in a product list, and a certain user operation with respect to the registered face-to-face selling product is admitted.

The above-describe software management system is a system that changes an object to be displayed or an object to be operated, in accordance with the user's right and properties of a product (particularly, whether or not the product has been registered). In particular, the software management system is configured to handle a face-to-face selling product in accordance with an on-line selling product even in a case where the user does not have an on-line purchase right. In that sense, each of the information management device and the software management device has a characteristic configuration in a relationship with a face-to-face selling product.

8. Others

In the above-described exemplary embodiment, a configuration may be added which supports a user who does not have a WEB purchase right, in requesting the addition of a license (the change of license information) with respect to a registered face-to-face selling product. For example, a button for making contact with a product seller by e-mail may be displayed on the screen, or the pop-up display of a contact address may be performed.

One image forming device may serve as an object to be subjected to software management. On the other hand, in a case where a large number of software products installed in plural image forming devices are managed by the software management device, it is possible to reduce burden on the user by integral or unitary management. An object to be subjected to software management may be a PC, a portable terminal, or the like.

In the exemplary embodiment, the information management device is connected to an external network, but the information management device may be connected to the same internal network together with the software management device. Alternatively, it is also considered that the software management device and the information management device are integrated with each other. As described above, the information management device and the product selling device may be integrated with each other.

In the above-described exemplary embodiment, a product list is generated by the information management device, but may be generated by the software management device. In the above-described exemplary embodiment, a free product is included in a usable product list and the like, but separate product lists for a pay product and a free product may be configured. Here, in a case where the user has a face-to-face selling product and the registration of license information for the face-to-face selling product has been completed, a registered face-to-face selling product is included in a pay product list. Meanwhile, it is also considered that a mode in which the display of a registered face-to-face selling product is admitted, but the operation therefor is not admitted in the license management device is adopted.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A software management device comprising:
a communication unit, connected to an information management device and configured to receive a product list from the information management device;
an input unit, configured to receive a user operation;
a display which is a section that displays the product list showing at least one item of a software product satisfying a predetermined condition, the at least one item including an item indicating a registered face-to-face selling product which is sold on line and installed by a personnel and for which license information has been registered, in a case where the registered face-to-face selling product satisfies the predetermined condition; and
a controller that receives at least one type of user operation with respect to an on-line selling product, which is a software product sold on line, in a case where a user has an on-line purchase right, and restricts at least one of the at least one type of user operation to be received with respect to the registered face-to-face selling product in a case where the user does not have the on-line purchase right.

2. The software management device according to claim 1, wherein the controller receives all of a plurality of types of operations as the user operations with respect to the on-line selling product and the registered face-to-face selling product in a case where the user has the on-line purchase right, and receives some of the plurality of types of operations as the user operation with respect to the registered face-to-face selling product in a case where the user does not have the on-line purchase right.

3. The software management device according to claim 2, wherein in a case where the user does not have the on-line purchase right, the operation which is not received by the controller includes an operation for on-line purchase.

4. The software management device according to claim 2, wherein in a case where the user does not have the on-line purchase right, some of operations received by the controller include a downloading operation, an installation operation, an updating operation, and an uninstallation operation.

5. The software management device according to claim 1, wherein the software product satisfying the predetermined condition includes an on-line selling product and a registered face-to-face selling product which are purchased by the user in a case where the user has the on-line purchase right, and includes a registered face-to-face selling product purchased by the user in a case where the user does not have the on-line purchase right.

6. The software management device according to claim 5, wherein the software product satisfying the predetermined condition further includes a free product, regardless of whether or not the user has the on-line purchase right.

7. The software management device according to claim 1, wherein the software product satisfying the predetermined condition is a software product installed in a device to be subjected to software management, and
wherein the product list includes the item indicating the registered face-to-face selling product in a case where the registered face-to-face selling product is installed in the device.

8. A software management system comprising:
a software management device which is connected to an image forming device; and
an information management device which is connected to the software management device,
wherein the information management device includes
a license information memory in which license information of an on-line selling product is registered in a case where a software product for the image forming device is sold on line, and license information of a face-to-face selling product is registered in a case where the software product for the image forming device is sold on line and installed by a personnel and to-be-registered information on the software product is input, and
a product list generation section which is a section that generates a product list including an item indicating a software product purchased by a user, the product list generation section generating a product list including an item indicating an on-line selling product in a case where the user purchases the on-line selling product, and generating a product list including an item indicating a registered face-to-face selling product in a case where the user purchases the registered face-to-face selling product for which the license information has been registered, and
wherein the software management device includes
a communication unit, connected to an information management device and configured to receive a product list from the information management device;
an input unit, configured to receive a user operation;
a display that displays the product list, and
a controller that receives all of a plurality of types of operations as a user operation with respect to the on-line selling product and the registered face-to-face selling product in a case where the user has an on-line purchase right, and receives a portion of the plurality of types of operations as a user operation with respect to the registered face-to-face selling product in a case where the user does not have the on-line purchase right.

9. The software management system according to claim 8, wherein the information management device includes
a first license information registration section that registers the license information of the on-line selling product in the license information memory during the on-line selling of the on-line selling product, and
a second license information registration section that registers the license information of the face-to-face selling product in the license information memory based on the to-be-registered information, during or after the selling of the face-to-face selling product.

10. A non-transitory computer readable medium storing a program which causes, when executed by a controller of an information processing device that manages a software product, the controller to execute:
a function of displaying a product list showing at least one item of a software product satisfying a predetermined condition, the at least one item including an item indicating a registered face-to-face selling product which is sold on line and installed by a personnel and for which license information has been registered, in a case where the registered face-to-face selling product satisfies the predetermined condition; and
a function of receiving at least one type of user operation with respect to an on-line selling product, which is a software product sold on line, in a case where the a user has an on-line purchase right, and restricts at least one of the at least one type of user operation to be received with respect to the registered face-to-face selling product in a case where the user does not have the on-line purchase right.

\* \* \* \* \*